(No Model.) 3 Sheets—Sheet 1.
J. GRAHAM.
AUTOMATIC GRAIN WEIGHING DEVICE.
No. 519,707. Patented May 15, 1894.
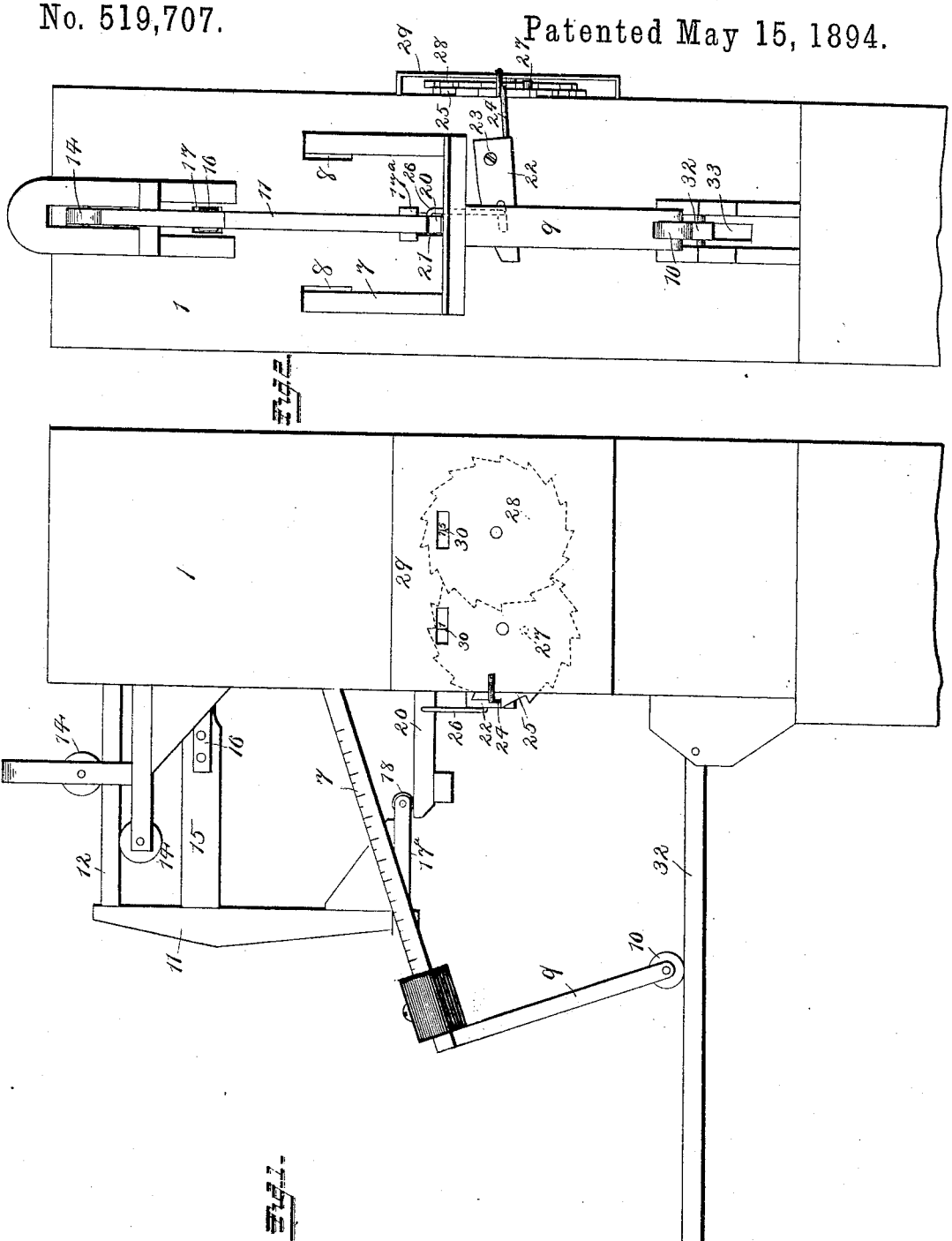
Witnesses
C. S. Frye
G. T. Myers
Inventor
John Graham
By Hopkins & Peckham
Attorneys

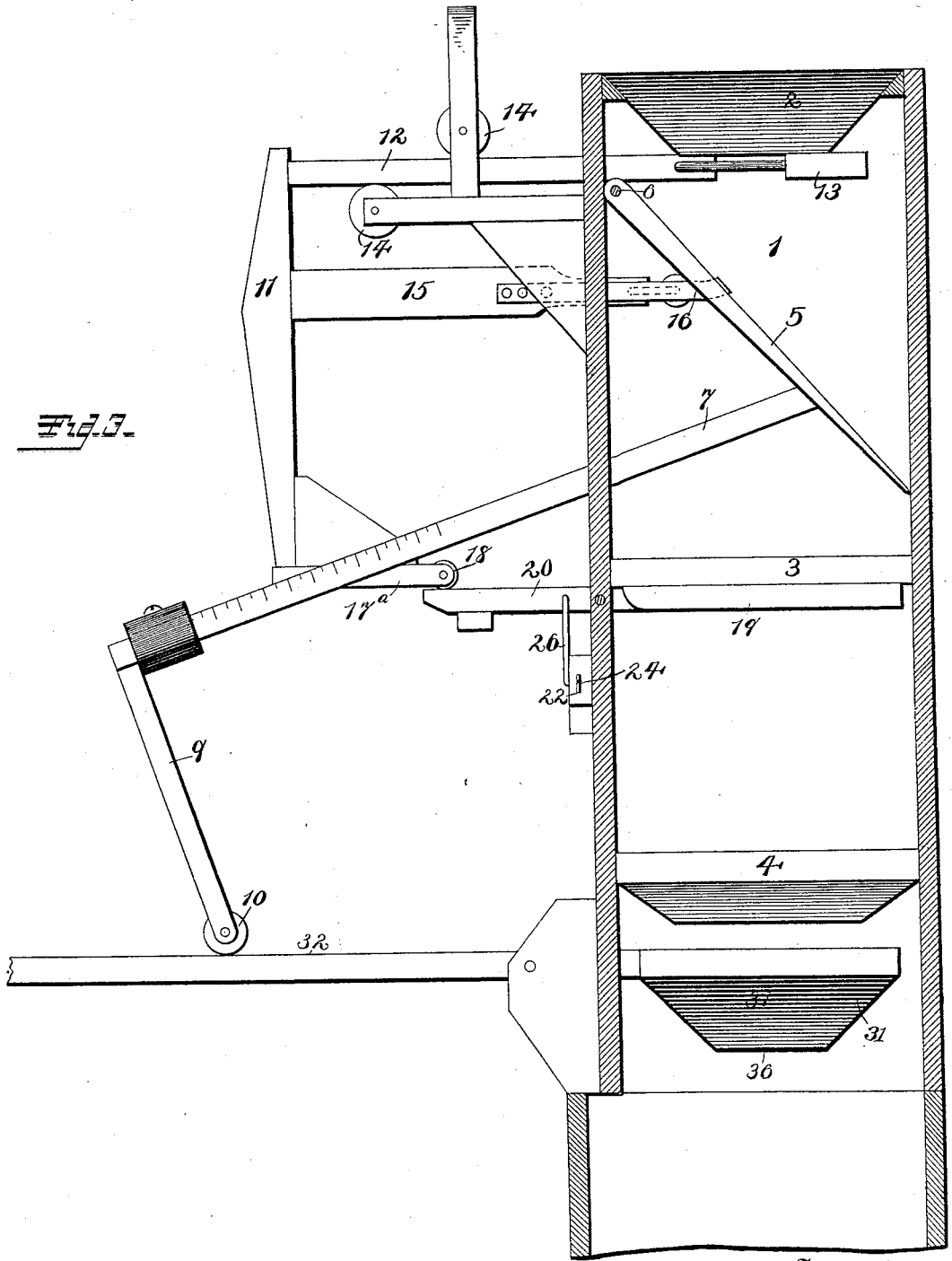

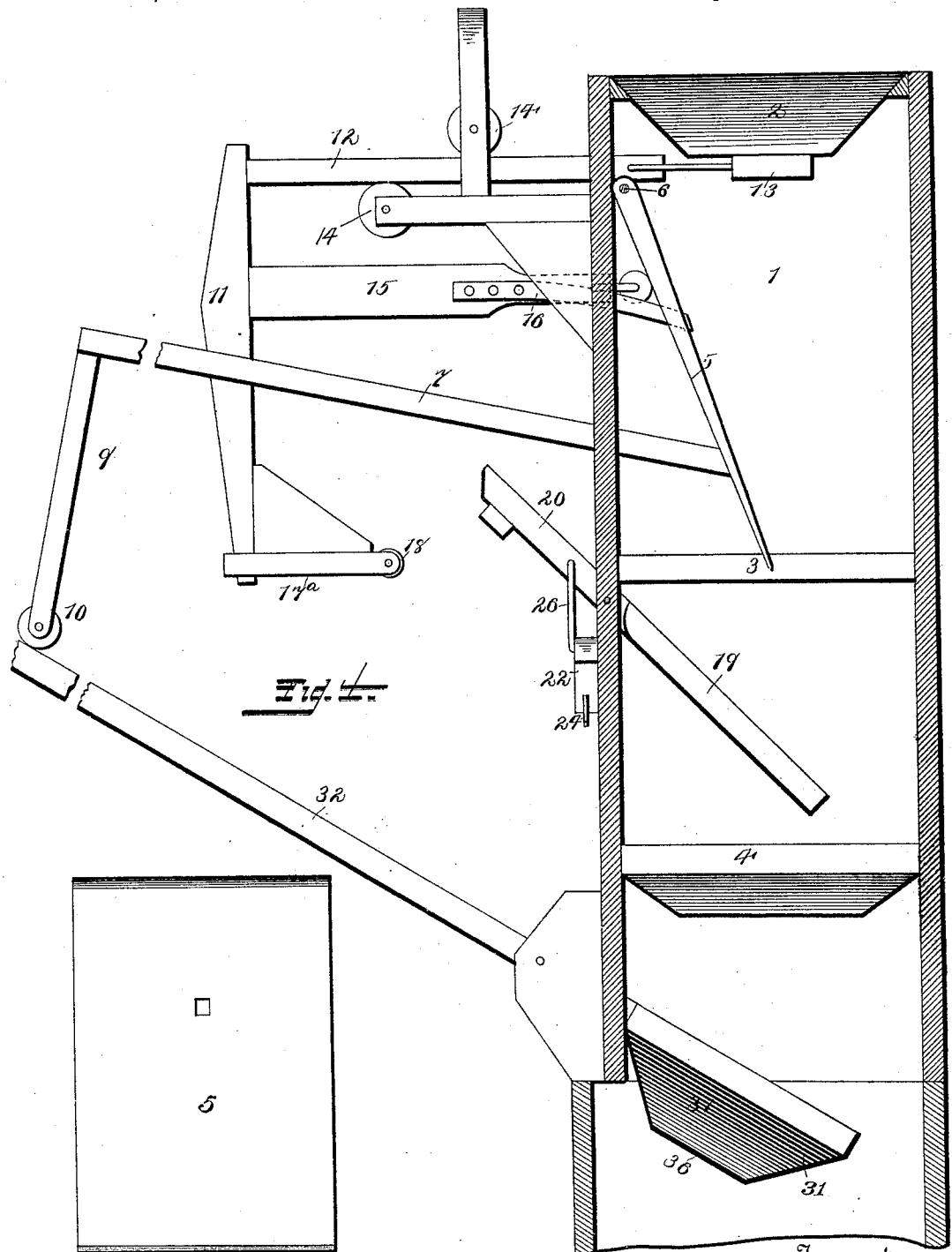

UNITED STATES PATENT OFFICE.

JOHN GRAHAM, OF ALBANY, MISSOURI.

AUTOMATIC GRAIN-WEIGHING DEVICE.

SPECIFICATION forming part of Letters Patent No. 519,707, dated May 15, 1894.

Application filed February 9, 1893. Serial No. 461,589. (No model.)

*To all whom it may concern:*

Be it known that I, JOHN GRAHAM, of Albany, county of Gentry, and State of Missouri, have invented certain new and useful Improvements in Automatic Weighing Devices, of which the following is a specification, reference being had to the accompanying drawings.

The object of the invention is to produce a simple, comparatively cheap, and an accurate device for accurately weighing grain or the like automatically.

In the accompanying drawings, Figure 1 is a side elevation of the machine. Fig. 2 is a rear elevation of the same. Fig. 3 is a side elevation with the side removed, showing the relative position of the parts when set to receive a quantity of grain. Fig. 4 is a similar view, showing the position of the parts in the position for passing grain. This view is a somewhat artificial one to show the operation. Fig. 5 is a detailed view of the balance plate detached.

In practice the movement of the parts indicated herein is a successive one, and not a simultaneous one.

Referring to the figures on the drawings, 1 indicates a case or frame, having fixed hoppers 2, and 4. The hopper 2 forms a top to the case, and is the initial receptacle for the material to be weighed, the hopper 4 serving to direct the same unto the hopper 31 hereinafter described.

5 indicates a balance-plate, movably secured under the hopper 2. It is, for example, hinged, as indicated at 6, to the rear wall of the case. To the rear side of the balance-plate a beam 7 is firmly secured. It is preferably bifurcated, as shown, so as to enable it to project through vertical slots 8 in the wall of the case. It carries upon its free end an arm 9 provided on its lower end with an anti-friction roller 10. Upon this beam weights may be adjusted to measure the amount of resistance it will oppose to the movement of the balance-plate, it being obvious that the weight of the grain upon the balance plate 5 must lift the weights upon the beam 7, the pivotal point of the frame, composed of the parts 5, 7, and 9 being considerably to one side of its center of gravity. It may be constructed of a certain relative weight in the first instance, so that each movement of the balance-plate will indicate a certain quantity, as for example a bushel. The balance-plate, as shown, extends obliquely across the case and presents an inclined face to the hopper 2, through which it receives the substance to be weighed.

11 indicates a gate-frame. Upon its upper end it carries an arm 12 that projects through the wall of the case and carries upon its inner extremity a cut-off 13. This arm is carried between anti-friction rollers 14 so as to constitute it a readily movable and sufficient support for the frame 11, tilting being prevented by its lower portion being somewhat ponderous.

15 indicates a balance-plate arm, projecting from the frame and secured, as by a strap 16 passing through a slot 17, in the wall of the case to the balance plate. By reason of its flexible connection the movement of the balance-plate is in nowise interfered with, but when the balance-plate is in the position for weighing, it tends to keep the gate-frame drawn to the forward limit of its travel. The cut-off 13, as above indicated, is carried upon the extremity of the arm 12, so that in this position of the gate-frame the cut-off leaves the bottom of the hopper 2 open. If the balance-plate is depressed the balance-plate arm 15 is pushed back, and the gate-frame is caused to travel rearwardly, drawing with it the cut-off, and so covering the bottom of the hopper 2. Upon its lower end the gate-frame carries a trip-arm 17ª, having an anti-friction roller 18 upon its free end.

19 indicates a trap, located immediately below the apertured partition 3.

20 indicates a finger secured at one end to the trap, and projecting through an opening 21 in the rear wall of the case. The finger is counterweighted so as to normally hold the trap in the horizontal position under the hopper 3. The end of the finger projects in the path of the trip-arm 17ª. As long as the gate-frame is in the forward limit of its travel, the trip-arm will hold the trap in the horizontal position, notwithstanding a weight is imposed upon it which will overbalance the weight of the finger 20. If, however, the balance-plate is depressed until the gate plate moves back and carries the cut-off across the bottom of the hopper 2, the trip-arm will release the finger 20, and will allow the trap to drop its load.

22 indicates a lever pivoted at 23 to the rear wall of the case, and having a pawl 24 extending outwardly in the path of a ratchet-disk 25, pivoted to the side of the case.

26 indicates a pitman loosely connected at one end to the lever and at the other end to the finger 20. By the movement of the finger 20 the lever 22 is oscillated, and with each oscillation imparts a partial rotary movement to the disk 25.

27 indicates an eccentric stud projecting from the face of the disk 25.

28 indicates a ratchet-disk pivoted to the wall of the case. Its teeth are in the path of the stud 27, so that with each complete rotation of the disk 25, the disk 28 is made to advance the distance of one of its ratchet teeth. These disks, which constitute the registering mechanism, will be properly graduated, so as to afford means of reading the number of drops of the trap. For this purpose they are preferably provided with a cover 29 having index fingers 30.

The office of the hopper 2, with respect to the trap, is to deposit grain in the center of trap and prevent wedging of it between the sides of the trap and the walls of the case.

31 indicates a hopper carried on an arm 32 passing through an aperture 33 in the wall of the case, and pivoted therein in suitable bearings. The hopper 31 is located under the fixed hopper 4, so that grain dropped from the trap is deposited into the hopper 31. The aperture 36 in the bottom of the hopper 31 is small, so that the grain will accumulate therein and escape from it slowly, thereby controlling the operations of the machine in the following manner. The lever-arm 32 extends in the path of the arm 9 carried upon the beam 7, and while sufficient weight is in the hopper 31, its lever-arm raises the beam, thereby depressing the balance-plate and keeping the cut-off in the closed position.

In operation, the parts being in the position shown in Fig. 3, grain is fed into the hopper 2, whence it descends upon the balance-plate 5. When a sufficient amount has accumulated upon the balance-plate to lift the beam 7, the gate-frame travels rearwardly and closes the cut-off 13. Meantime, the grain, having been deposited upon the trap, and the trap having been released, drops into the hopper 31. Thereupon the lever-arm 32 is elevated and keeps the cut-off in the closed position, as above mentioned. In this interval the grain is altogether deposited into the hopper 31, and when the weight of the hopper is sufficiently diminished to allow the lever-arm 32 to descend, the parts will reassume the position shown in Fig. 3 of the drawings, the cut-off will be open, and the operation may repeat itself as before.

While certain particular forms of mechanism have been shown for accomplishing the purpose sought in this invention, they are not all essential to its operation, but may be varied in many ways without departing from the scope of the invention.

What is claimed is—

1. In a weigher, the combination with a case and balance plate and trap therein, of a horizontally movable gate frame upon the outside of the case carrying a cut-off within the case and controlling the operation of the trap and operatively connected to the balance plate, whereby the weight of the material upon the balance plate operates to cut-off through said gate frame the flow of material to be weighed at a point above the balance plate and the trap is thereafter released, substantially as specified.

2. In a weigher, the combination with a case, of a cut-off and trap, and an intermediate balance plate within the case, mechanism operatively connecting the balance plate and cut-off, and adapted to be actuated by said balance plate to release the trap under predetermined pressure, and mechanism below the trap adapted to be actuated by the material to be weighed to keep the cut-off in the closed position until the case has been sufficiently relieved of said material substantially as specified.

3. In a weigher, the combination with a case and a cut-off and trap therein, of an intermediate balance plate, mechanism operatively connecting the balance plate with the cut-off and adapted to be actuated by said balance plate to release the trap, and a weight beam provided with an adjustable weight, operatively connected to said balance plate whereby the weight of the material required to actuate the balance plate may be varied, substantially as specified.

4. In a weigher, the combination with a case, a cut-off and a movable hopper, of a trap and balance plate therebetween, mechanism operatively connecting the balance plate and cut-off and controlling the movement of the trap, and mechanism operatively connecting the balance plate and movable hopper whereby the movement of the balance plate under a predetermined pressure actuates the cut-off to stop the flow of material to be weighed, thereafter releases the trap and permits the material within the case to actuate the movable hopper to sustain the cut-off in the closed position until the case is sufficiently relieved of its contents, substantially as specified.

5. In a weigher, the combination with a case and a cut-off and trap therein, and an intermediate balance plate, of mechanism operatively connecting said cut-off and balance plate and adapted to intermittently control the movement of said trap and registering mechanism operatively connected with said trap, substantially as specified.

6. In a weigher, the combination with a case and a cut-off, counter-weighted trap, and intermediate balance plate therein, of a reciprocatory gate frame upon the exterior of the case operatively connecting the balance plate and cut-off and adapted to control the movement of the trap and to be reciprocated by the downward movement of the balance plate to close the cut-off and release the trap, and a weight beam operatively connected with the balance plate whereby the material to be weighed having passed beyond the trap, said trap will automatically resume its horizontal position under the impulse of its counter-weight and the weight beam will return the balance plate to its normal position and actuate the gate frame to lock the trap and open the cut-off, substantially as specified.

7. In a weigher, the combination with a case and a cut-off and counter-weighted trap therein, of an intermediate balance plate provided with a weight beam having a right angular extension and roller, a reciprocatory gate frame upon the exterior of the case operatively connected with the cut-off and balance plate and adapted to control the movement of the trap, a pivoted lever projecting beyond the side of the case in the path of the roller, and a movable hopper adapted to be actuated by said lever, substantially as specified.

8. In a weigher, the combination with a case, cut-off, trap and intermediate balance plate therein, of mechanism operatively connecting said balance plate and cut-off and adapted to control the movement of the trap, a movable hopper below the trap and an intermediate fixed hopper having converging sides whereby the material to be weighed is prevented from escaping around the sides of the movable hopper, substantially as specified.

9. In a weigher, the combination with a case, a stationary hopper and movable hopper therein at its top and bottom respectively, of a reciprocatory cut-off beneath the stationary hopper, a trap and a reciprocatory gate frame adapted by its reciprocation to open and close the stationary hopper through the cut-off, and to release or secure the trap, a swinging balance plate within said casing above the trap operatively connected with the gate frame and provided with a weight beam having a right angular projection and roller, and a lever secured to said movable hopper and adapted when the hopper is actuated under pressure to sustain the weight beam, balance plate, reciprocatory frame and cut-off in the position they assume at the time of the initial operation, substantially as specified.

In testimony of all which I have hereunto subscribed my name.

JOHN GRAHAM.

Witnesses:
E. L. PEERY,
JNO. A. HARRISON.